United States Patent
Gaete Maureira

(10) Patent No.: US 10,473,508 B2
(45) Date of Patent: Nov. 12, 2019

(54) MEASURING TANK FLUIDS AND REMOTE MONITORING SYSTEM

(71) Applicant: Tarco Trazabilidad SPA, Santiago (CL)

(72) Inventor: Pablo Andrés Gaete Maureira, Santiago (CL)

(73) Assignee: Tarco Trazabilidad SPA, Santiago (CL)

( * ) Notice: Subject to any disclaimer, the term of this patent is extended or adjusted under 35 U.S.C. 154(b) by 70 days.

(21) Appl. No.: 15/532,553

(22) PCT Filed: Dec. 2, 2014

(86) PCT No.: PCT/CL2014/000068
§ 371 (c)(1),
(2) Date: Jun. 2, 2017

(87) PCT Pub. No.: WO2016/086326
PCT Pub. Date: Jun. 9, 2016

(65) Prior Publication Data
US 2017/0350746 A1    Dec. 7, 2017

(51) Int. Cl.
| | |
|---|---|
| *G01F 23/00* | (2006.01) |
| *G01F 23/24* | (2006.01) |
| *B60K 15/073* | (2006.01) |
| *G01F 23/02* | (2006.01) |
| *B60K 15/03* | (2006.01) |
| *G01F 23/30* | (2006.01) |
| *G01F 23/76* | (2006.01) |

(52) U.S. Cl.
CPC ............ *G01F 23/24* (2013.01); *B60K 15/073* (2013.01); *G01F 23/0046* (2013.01); *B60K 2015/03197* (2013.01); *B60K 2015/03217* (2013.01); *B60K 2015/03335* (2013.01); *B60Y 2200/41* (2013.01); *G01F 23/303* (2013.01); *G01F 23/76* (2013.01)

(58) Field of Classification Search
CPC ..... G01F 23/02; G01F 23/303; G01F 23/0046
USPC ..................................... 73/305–322
See application file for complete search history.

(56) References Cited

U.S. PATENT DOCUMENTS

| | | | | |
|---|---|---|---|---|
| 2,361,440 | A * | 10/1944 | Williamson | ............ G01F 23/02 73/299 |
| 2,533,490 | A * | 12/1950 | McGrath | .................. G01F 23/02 362/23.15 |
| 2,767,585 | A * | 10/1956 | Cosgrove | ................. G01F 23/42 73/321 |

(Continued)

FOREIGN PATENT DOCUMENTS

| | | |
|---|---|---|
| JP | 2009-186283 A | 8/2009 |
| WO | 2012/095838 A1 | 7/2012 |

*Primary Examiner* — Herbert K Roberts
(74) *Attorney, Agent, or Firm* — DLA Piper LLP (US)

(57) ABSTRACT

A device that measures fluid level in fuel storage tanks of mining trucks resistant to rapid filling includes an externally mounted sensor, a protective metallic tube, an anchorage system, and a pressure dissipator; and a remote monitor system that controls fluid level in fuel storage tanks of mining trucks includes a device that measures fluid level in fuel storage tanks of mining trucks including an externally mounted sensor, a protective metallic tube, an anchorage system and pressure dissipator, antennas, a Web server, remote means, and a power source.

7 Claims, 8 Drawing Sheets

(56) References Cited

U.S. PATENT DOCUMENTS

| | | | | |
|---|---|---|---|---|
| 2,934,953 | A | * | 5/1960 | Anderson .............. G01B 23/66 73/319 |
| 2,949,031 | A | * | 8/1960 | Bruni .................... G01F 23/02 73/293 |
| 3,062,049 | A | * | 11/1962 | Javor .................... G01F 23/02 73/323 |
| 3,066,533 | A | * | 12/1962 | Herold .................. G01F 23/02 73/328 |
| 4,292,620 | A | | 9/1981 | Pagane |
| 4,512,190 | A | * | 4/1985 | Sledmere ............... G01F 23/72 335/302 |
| 4,696,261 | A | * | 9/1987 | Hayashi ............... F01P 3/2285 123/41.21 |
| 4,807,473 | A | * | 2/1989 | Jackson ................ F16L 55/00 285/93 |
| 5,062,295 | A | * | 11/1991 | Shakkottai .......... G01F 23/2962 340/621 |
| 5,103,674 | A | * | 4/1992 | Outwater .............. G01F 23/72 376/258 |
| 5,295,359 | A | * | 3/1994 | Reilly, Jr. ............. F04B 39/02 184/108 |
| 5,323,653 | A | * | 6/1994 | Gruett .................. G01K 13/02 374/E13.006 |
| 5,793,705 | A | | 8/1998 | Gazis et al. |
| 6,073,492 | A | * | 6/2000 | Rosselson ........... G01F 23/2961 73/1.83 |
| 6,435,026 | B1 | * | 8/2002 | Donehue .............. G01F 23/74 73/314 |
| 6,484,088 | B1 | | 11/2002 | Reimer |
| 6,490,920 | B1 | | 12/2002 | Netzer |
| 6,691,025 | B2 | | 2/2004 | Reimer |
| 7,421,895 | B1 | | 9/2008 | Caldwell |
| 8,933,810 | B1 | * | 1/2015 | Donehue ............. G01F 23/0046 340/618 |
| 2002/0014118 | A1 | | 2/2002 | Wech |
| 2004/0226362 | A1 | * | 11/2004 | Marx .................. G01F 23/2962 73/290 V |
| 2007/0214881 | A1 | * | 9/2007 | Shu ........................ G01F 22/00 73/295 |
| 2009/0056438 | A1 | * | 3/2009 | Hughes .................. G01F 23/02 73/323 |
| 2009/0145218 | A1 | * | 6/2009 | Wells .................. G01F 23/0046 73/290 R |
| 2009/0288483 | A1 | * | 11/2009 | Varga .................... G01F 23/303 73/292 |
| 2011/0253922 | A1 | * | 10/2011 | Hughes ................ F16K 5/0207 251/315.01 |
| 2012/0036927 | A1 | * | 2/2012 | Sanders ................ G01F 23/02 73/291 |
| 2012/0324996 | A1 | * | 12/2012 | Taylor ................... G01F 23/72 73/313 |
| 2013/0018604 | A1 | | 1/2013 | Bahorich et al. |
| 2014/0238156 | A1 | * | 8/2014 | Aljohani ............... G01F 23/02 73/864.63 |
| 2015/0253179 | A1 | * | 9/2015 | Carlson ................. G01F 23/72 116/204 |
| 2017/0059385 | A1 | * | 3/2017 | Vander Horst ......... G01F 23/14 |
| 2017/0138780 | A1 | * | 5/2017 | Curry .................... G01F 23/64 |

\* cited by examiner

TANK EXTERIOR ANCHORAGE SYSTEM DETAIL

TANK INTERIOR ANCHORAGE SYSTEM DETAIL

TANK INTERIOR ANCHORAGE ELEVATION

ANCHORAGE TO TANK SECTION CUT

ANCHORAGE EXTERIOR PART CUT

MEASURING TANK FLUIDS AND REMOTE MONITORING SYSTEM

TECHNICAL FIELD

This disclosure relates to a device for measuring fluid levels in fuel storage tanks of mining trucks, comprising an externally mounted sensor, wherein the sensor is resistant against the harsh environmental conditions of the large mining industry and resistant to the rapid fuel-filling systems used currently.

The disclosure also relates to a remote monitoring system for controlling the fluid level in fuel storage tanks of mining trucks, comprising an externally mounted sensor, wherein the sensor is resistant against the harsh environmental conditions of the large mining industry and resistant to the rapid fuel-filling systems used currently.

BACKGROUND

In the large mining industry, due to high operational costs, it is increasingly necessary to be equipped with systems that allow for mine operation optimization.

Particularly, huge mining trucks account for a relevant part of the mine operational costs. For this reason, every improvement associated with mining trucks operation implies contributions to the overall productivity of the mine. A significant factor in the operation of mining trucks is the frequency with which the truck tank is filled with fuel and other fluids. The lack of fuel or other fluids can make the truck stop and even cause damage, resulting in mine loss productivity and efficiency.

Measuring tank levels by floater systems or devices is widely known from, for example, U.S. Pat. No. 7,421,895, JP 2009-186283 and US 2013/0018604), which are installed in the tank interior and, by a transducer (typically a variable resistor), the floater position in the tank is converted into an electrical signal, which can be interpreted as the fluid level in the tank. Those mechanisms are commonly used in several types of vehicle tanks and/or other tanks. However, those measurement systems are inaccurate and not resistant to the fast fluid-filling systems used currently in the large mining industry.

There are several alternative measurement systems for tank levels such as ultrasonic sensors (U.S. Pat. Nos. 5,793,705 and 6,484,088) and capacitive sensors (U.S. Pat. No. 6,490,920 and WO 2012/095838). However, none of those systems have an adequate resistor to be used in the trucks of the large mining industry, and they are not adapted to resist tank rapid fluid-filling systems.

It is worth mentioning that to improve truck availability in the mining industry, a fast fluid-filling technology was implemented to reduce waiting times during fuel replenishment. That fast fluid-filling system allows reducing fuel tank filling time by 5 times, having a huge impact on productivity and availability of mining trucks. However, that rapid fuel-filling system destroys fuel level measurement elements due to the turbulence and pressure generated by injecting high pressure fuel into the tank.

As a result, the fuel sensor is damaged and the truck may become unusable during a valuable period and then, the decision of going to the fuel replenishment area is in the hands of the truck operator's experience, thereby producing huge economic losses as a result of the operator's bad practices and/or sub-optimal refueling in trucks.

Therefore, there is a need to have a measurement device for fuel and/or other fluid levels that is resistant to rapid fuel-filling and/or severe environmental conditions of the mine.

There is also a need to integrate telemetry and connectivity solutions that allow for monitoring the levels of fuel and other fluids remotely for the purpose of managing truck operation centrally and taking actions accordingly to improve the fleet productivity.

SUMMARY

I provide a measurement device providing ease of installation and effective protection of sensors. The main characteristics of the measurement device for fluid levels include the following:
  a) protecting the sensor against the impact caused by high pressure fluid filling; and
  b) measuring the fluid levels accurately in irregular geometry tanks.

The measurement device also provides for installation in different models of commercially available mining trucks and allows monitoring fluid levels remotely to manage truck operation centrally and be able to take actions to improve the fleet productivity.

To monitor the fluid levels of the mining trucks remotely, I integrate several devices, including for instance, temperature measuring devices and fluid levels such as oil and fuel. The measuring device for fluid levels is comprised of a fuel level sensor to measure the fuel level and compatible with rapid fuel-filling systems adopted by the industry to improve the time in use of trucks.

My remote monitoring system allows:
  a) controlling the availability of trucks that are in motion by advising of fuel and/other fluids levels in real time; and
  b) taking actions so that a particular truck is directed on time to the refueling center, and avoiding additional waiting times before the fuel tank is filled at the refueling center.

Moreover, the remote monitoring system allows:
  c) having supplementary information about the route, speed and location of each of the trucks, reducing costs with better planning and control, and lowering waiting times at fueling and fuel economy.

SYSTEM COMPONENTS

Figure 1:
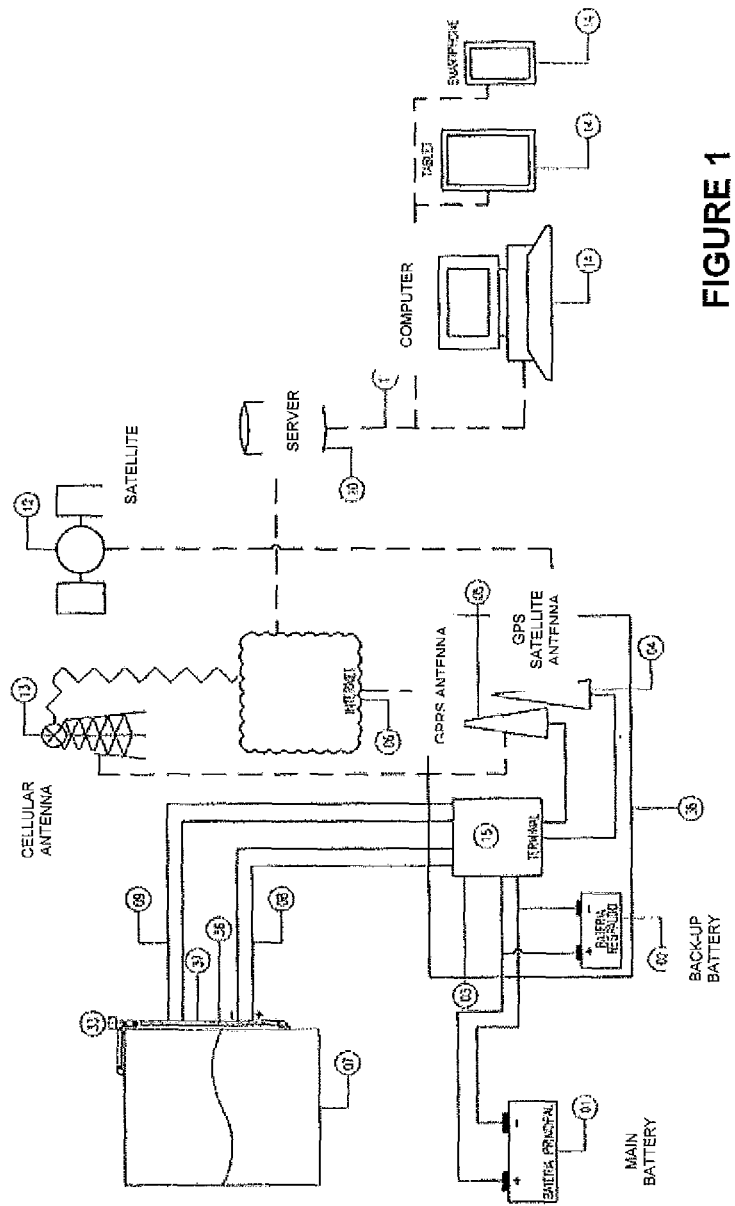
FIG. 1 illustrates a general chart of the remote monitoring system and how the different components are connected.

01 Main source
02 Back-up battery
03 Terminal
04 Satellite GPS antenna
05 GPRS antenna
06 Internet
07 Tank
08 Electronic devices energy line
09 Data line connection means
10 Web server
11 Server connection
12 Satellite
13 Cellular antenna
14 Remote means
15 Connector
16 Lower anchorage system
17 American joint
18 Elbow
19 Packing
20 Exterior base
21 Pressure dissipator
22 Bolts
23 Interior base
24 Stems
25 American joint
26 Elbow
27 Upper anchorage system
28 Connection tube
29 American joint
30 Elbow
31 Elbow
32 Elbow
33 Protection box
34 T-tube
35 American joint
36 Sensor
37 Protective metallic tube
38 Protection box
39 Plates

DETAILED DESCRIPTION

I provide a device for measuring fluid level in fuel storage tanks of mining trucks, which is resistant to rapid filling and is comprised of: externally mounted sensor (36); protective metallic tube (37); anchorage system (16); and pressure dissipator (21).

I also provide a remote monitoring system for controlling the fluid level in fuel storage tanks of mining trucks, which is comprised of:

a device that measures fluid level in fuel storage tanks of mining trucks comprised of: externally mounted sensor (36); protective metallic tube (37); anchorage system (16); and pressure dissipator (21);
antennas (04, 05);
Web Server (10);
remote means (14); and
power source (01, 02).

The device for measuring fluid level in fuel storage tanks of mining trucks comprises a sensor (36) located outside the fuel tank. The sensor is inside a high-strength protective metallic tube (37). The sensor is a level sensor that may be selected from the group of rheostatic, ultrasound or floating sensors. The preferred sensor is a rheostatic sensor. The sensor can be replaced by other sensors of different technology with no need of making great changes to the protection system.

The device for measuring fluid level comprises an upper anchorage system (27) connected to an outlet at the top of the tank (07) and a lower anchorage system (16) connected to an outlet at the bottom of the rear wall of the tank (07). The sensor (36) communicates fluidly with the tank, keeping the same fluid level than the tank (07).

The remote monitoring system comprises a device for measuring fluid level, formed by a sensor (36) that converts the fluid level into a voltage and, in turn, the voltage is converted into a hex string format traveling from a terminal (03) through satellite (12) or GPRS by Internet connection (06) that arrives to server (10). Then, through a Web platform, the end user has access, upon entering a password, to the fleet vehicle(s) through this Web platform, where alerts and actions can be programmed according to the fluid levels; this data management allows the end user to take actions and improve fleet productivity.

As illustrated in FIG. 1, the remote monitoring system comprises a tank (07) formed by a protective metallic tube (37) externally attached to the tank (07) where the protective metallic tube has a level sensor (36) inside. The monitoring system also integrates telemetry and connectivity solutions by a GPRS antenna (05) and/or satellite GPS antenna (04) that enable transmission of collected data to a Web server (10) to have access to the information from remote means (14) such as computers, tablets or smartphones, to monitor fluid levels on line using appropriate software. Telemetry and connectivity devices are connected to a terminal (03) having a connector (15), which also connects to the protective metallic tube (37) by data line connection means (09) that enable data transference from the sensor to the terminal (03).

The information transmitted by sensor (36) is sent through telemetry and connectivity devices by the GPRS antenna (05) or satellite GPS antenna (04) to Internet (06), and it then travels from there looking for the destination IP address—that of the Web server (10). Information is stored and ordered according to the database(s) structure. This allows to access information from any remote means (14) with Internet access and Web browser.

The system is powered by a main source (01) and back-up battery (02). The main source (1) is supplied by the truck's energy rack, leaving the back-up battery (2) in the event there is any failure in the main system energization. Both power sources, the main source (01) and back-up battery (02), connect to the terminal (03) connector (15). In turn, the terminal (03) connects to the sensor (36) by energy lines (08) and also connect to telemetry and connectivity (04, 05) devices by energy transference lines providing those elements with electrical current.

Figure 2:
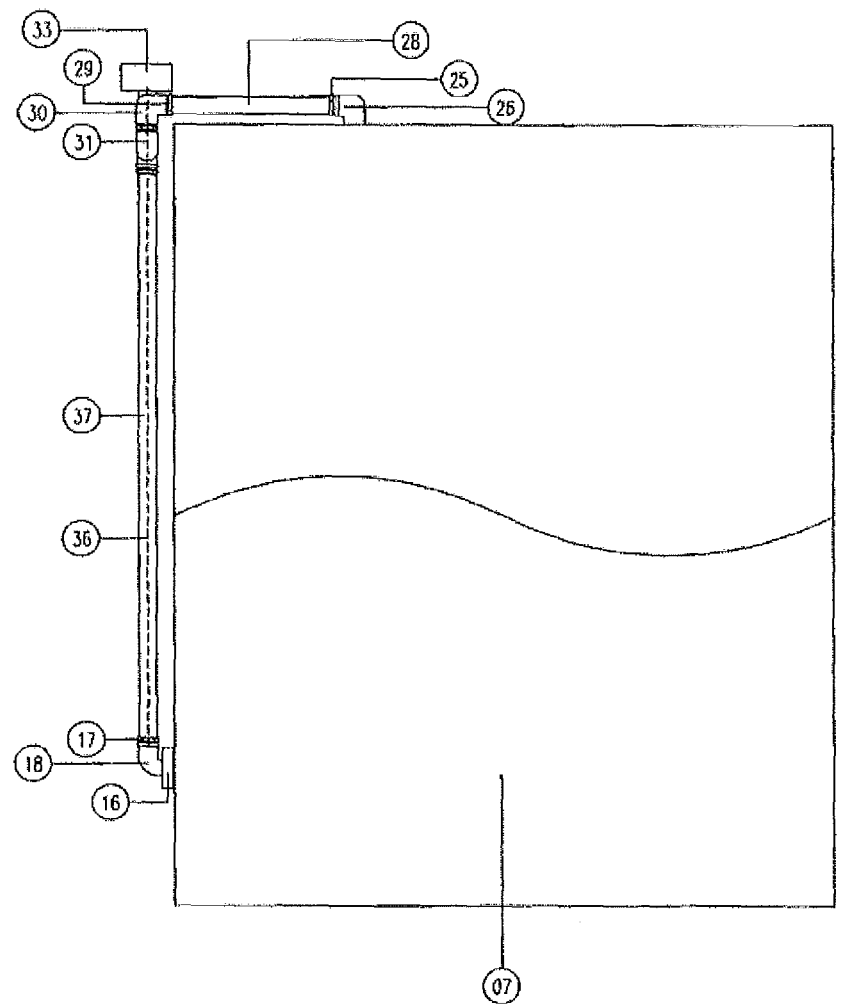
FIG. 2 illustrates a general view of the fluid level measuring device that is comprised of a protective metallic tube formed by a level sensor and also shows the location of a protective metallic tube in a tank.

FIG. 2 illustrates the device for measuring fluid levels, comprising a protective metallic tube (37), where the sensor

(36) is mounted internally. The protective metallic tube (37) at its top outlet connects to a protection box (33), wherein the sensor (36) electronic connections are located. The protection box (33) is then connected to a second protection box (38) placed near the truck's energization rack between the energy connection lines (08) of the electronic devices and data lines connection means (09). Inside the protection box (38) there are the terminal (03), a satellite GPS antenna (04) and GPRS antenna (05).

Figure 3A:
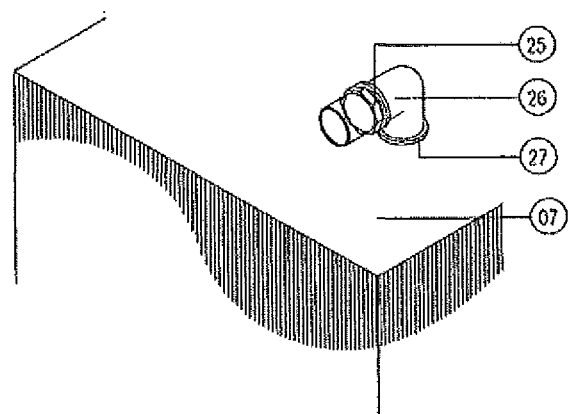
FIG. 3A illustrates the upper anchorage system of the protective metallic tube and its connection to the tank.

FIG. 3A illustrates the upper anchorage system (27) of the protective metallic tube joined to the tank (7), which comprises an American joint (25) and elbow (26).

Figure 3B:
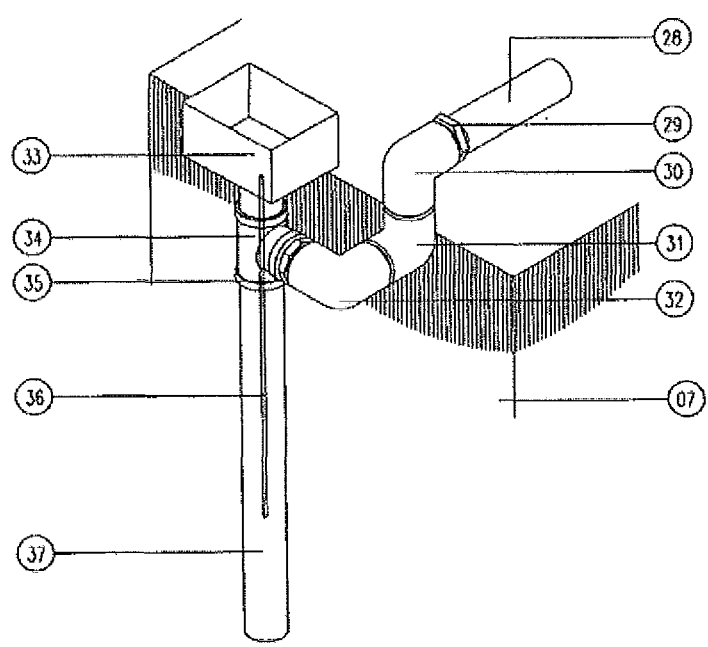
FIG. 3B illustrates more specifically the upper part of the protective metallic tube, level sensor, protection box and joining elbows.

FIG. 3B shows the device for measuring fluid levels, where the upper part of the protective metallic tube (37) connects to a T-tube (34).

Laterally, the T-tube connects to an American joint (35), which also connects to elbows (30, 31, and 32) following the tank outline and lastly connects by an American joint (29) to a connection tube (28) and American joint (25) connected to the tank through an elbow (26) and by the upper anchorage system (27). The structure of above-mentioned elbows (30, 31, 32) respond to the geometry typical of a mining truck tank of certain make. Therefore, when installing the system in a tank of different geometry, components will change but the connection logic will be the same—that is, connecting the measurement device both in the upper and lower part of the tank to measure.

The upper anchorage takes advantage of the breathers that are ready equipped in the mining truck, so it is simply an elbow (26) with a thread at one end.

If the installation needs to be made in a tank that is not equipped with a factory output or breather, an equivalent anchorage system should be used in the lower anchorage system (16). The lower anchorage system is described below.

Figure 4A:
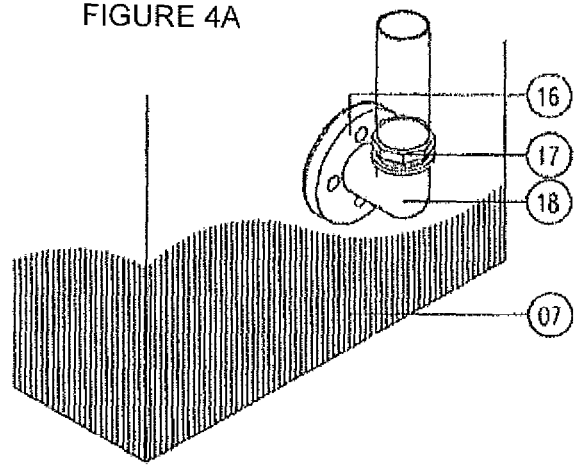
FIG. 4A illustrates the upper anchorage system and its connection to the tank.

FIG. 4A illustrates the lower part of the protective metallic tube connected to an American joint (17), which then connects to an elbow (18) connected to a lower anchorage system (16) externally connecting the protective metallic tube (37) with the tank (07). The lower connection allows for fluid connection inside the tank with the fluid inside the protective tube where the sensor is located. In this way, the fuel level inside the protective metallic tube, inside which there is the sensor (36), is the same than the level inside the tank (07), allowing the sensor (36) to obtain a reading based on the tank fuel level (07).

Figure 5:
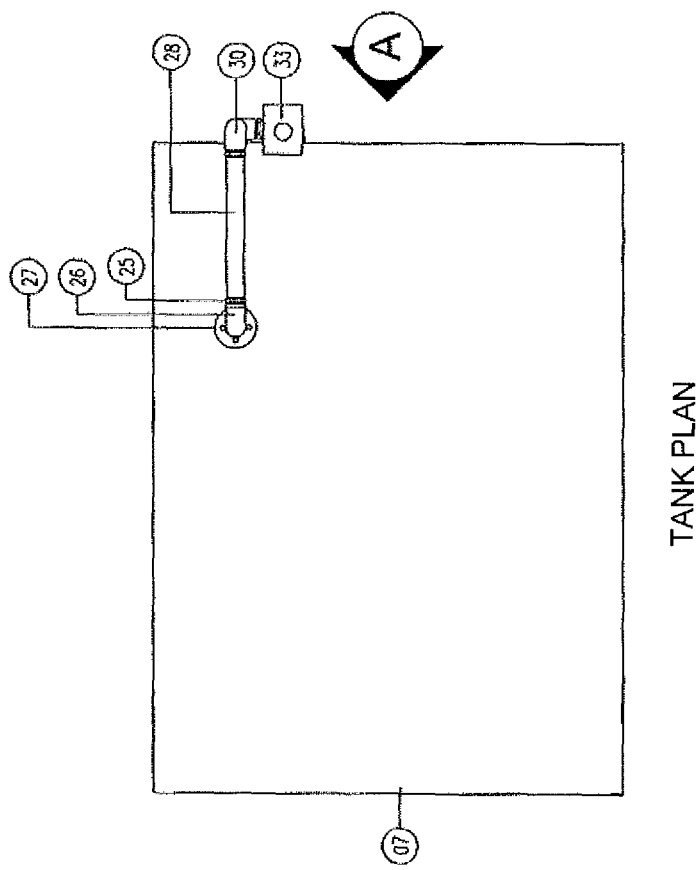
FIG. 5 illustrates a top plan view of the tank with the protective metallic tube mounted on the tank.
Figure 6:
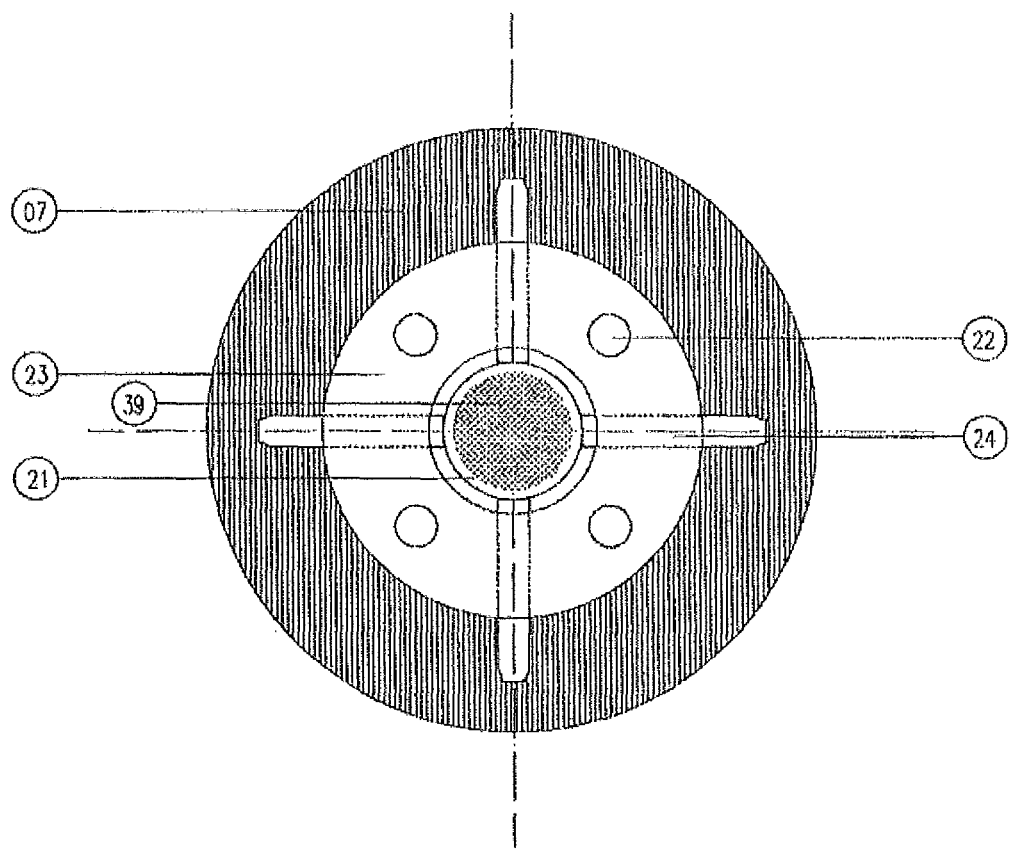
FIG. 6 illustrates an elevated plan view of the interior part of the anchorage system shown in FIG. 4C.

FIG. 5 illustrates a top plan of the device for measuring fluid levels, where the connection of the protective metallic tube to the tank is represented. FIG. 5 illustrates an upper anchorage system (27), an elbow (26), an American joint (25), a connection tube (28), an elbow (30), and the protection box (33) as well. The upper connection to the tank allows the air generated by the fluid entry to the conduit to travel to the tank upper part and pass freely through the fuel tank breather.

The protective metallic tube (37) is made of steel, and the protective metallic tube size and the sensor (36) size internally depend on the features and size of the tank to be monitored.

The protective metallic tube is made of steel, and the length of the sensor placed inside the protective metallic tube will depend on the tank dimensions, for example, the length of the sensor can vary between 1 m and 4 m, preferably between 1.5 to 3 m, and more preferably between 1.5 to 2 m.

Figure 4B:
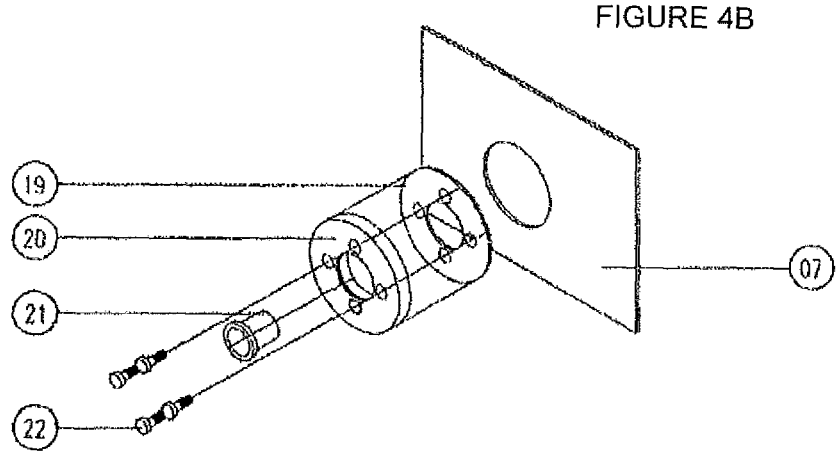
FIG. 4B illustrates the exterior part of the anchorage system including a packing, exterior base and pressure dissipator.
Figure 4C:
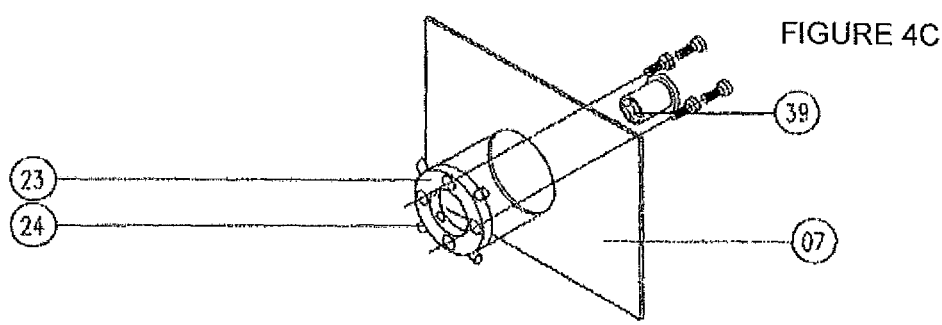
FIG. 4C illustrates the interior part of the anchorage system including an interior base and holding stems.

The lower anchorage system (16) shown more specifically in FIGS. 4B and 4C, comprises a packing (19), exterior base (20) mounted on the packing (19), and a pressure dissipator (21) located in the exterior base (20). The pressure dissipator (21) is internally attached to the elbow (18) (as shown in FIG. 4A), and to an interior base (23). The interior base (23) has stems (24) extending once the anchorage system is introduced into the tank interior and come into contact with the interior surface of the tank wall. The exterior base (20) is attached to the interior base (23) through bolts (22) bolted from the outside by holding the packing, exterior base (20), interior base (23) against the tank (07) wall.

Figure 7:
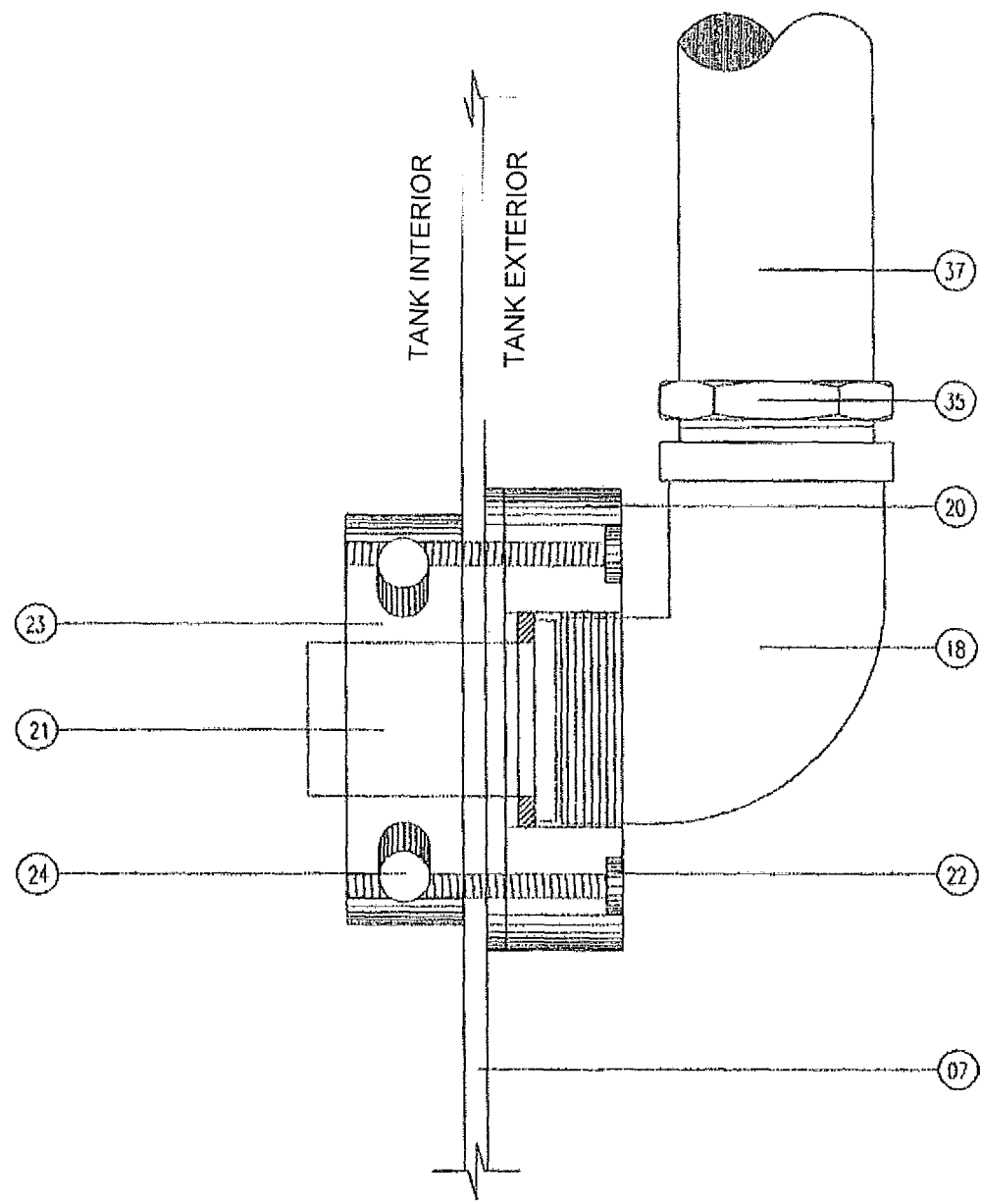
FIG. 7 illustrates a cross sectional view of the anchorage system, where both exterior and interior parts of the anchorage system are shown coupled to the tank wall.

The lower anchorage system (16), shown more specifically in FIGS. 4B, 4C and 7, illustrates the exterior base (20). The exterior base (20) is a flat cylindrical metallic piece whose outer diameter is higher than the diameter of the perforation done in the tank (07). The exterior base (20) has a circular inner orifice whose diameter is bigger than the pressure dissipator outer diameter. There is a bevel and thread in the inner diameter of the exterior base (20). The bevel is used to accommodate the pressure dissipator (21). The thread is used to join the exterior base (20) with the elbow (18). The exterior base (20) also has several thread orifices that can be passed through by Parker bolts (22) joining the exterior base (20) with the interior base (23).

The exterior base part that comes into contact with the tank wall (07) is mounted on a packing (19) to avoid fuel leaks from the tank interior.

The interior base (23) is a cylindrical metallic piece whose diameter is smaller than the perforation diameter made in the tank lower part. The interior base (23) has an inner orifice forming an inner diameter and radially perpendicular stems (24): Stems have rivets on the side towards the piece center preventing the stems from detaching from the interior base (23). The interior base also has thread perforations through which Parker bolts (22) are introduced to connect the exterior base (20) with the interior base (23).

The packing (19) has a flat circular shape and orifices through which bolts (22) are inserted. The outer diameter of the packing (19) is bigger than the perforation diameter made in the tank and has a circular inner orifice whose diameter is bigger than the pressure dissipator diameter.

The interior base (23) has a flat circular shape and orifices through which bolts (22) are inserted from the exterior base. The outer diameter of the interior base (23) is slightly smaller than the perforation diameter made in the tank to introduce the base. The interior base (23) has a circular inner orifice whose diameter is bigger than the pressure dissipator outer diameter.

The interior base (23) has stems (24) inside that are alternated with the thread perforations through which bolts are inserted. Stems are used to support securely the pressure dissipator that is accommodated inside the interior base.

Once the anchorage device is assembled, the exterior base (20), packing and interior base (23) are assembled by inserting bolts (22). The anchorage device is inserted in the tank and the stems (24) of the interior base (23) extend and allow for the interior base to be firmly secured inside the tank, securing the anchorage device. The anchorage device is then fitted to the tank. The pressure dissipator is inserted by the inner orifice formed by the inner diameter of the exterior base, packing and interior base. When the pressure dissipator passes through the interior base, it is fitted internally avoiding stem return. In this way, the anchorage device position is secured. Each of the stems has rivets at both ends ensuring that they are not detached from their position.

Bolts (22) pass through the exterior base and the rubber packing, securing the interior base.

The anchorage device can be assembled outside the tank, and its installation only requires an orifice in the tank to insert the interior base (23). Installation of the lower anchorage device requires just one orifice. That is, neither additional orifices nor welding are required. A tank breather is used to install the upper anchorage system. If the tank is not equipped with a breather, an orifice should be drilled in the tank to install the upper anchorage system.

The anchorage device is assembled externally and, once assembled, pieces are fitted into position in the tank. Once assembled, the device is inserted in the tank and the pressure dissipator is inserted into the bevel formed in the exterior base inner ring; then, the elbow (18) is fitted perpendicularly and bolts are tightening to secure the elbow (18), which is fitted to the protective tube (37), where the sensor is located.

The pressure dissipator (21) comprises some plates (39) or covers, allowing the dissipator to generating a pressure drop during fuel filling. This prevents the fuel level from raising to the sensor interior violently, avoiding potential damages to the sensor (36). The plates (39) or covers to the interior of the pressure dissipator have a screen with orifices or grillwork that allows reducing the speed at which the fuel enters the protective metallic tube—where the sensor is located.

The pressure dissipator (21) has the following functions:
a) reduces the flow rate generated by the pressure filling system, reducing the fuel pressure that impacts on the system, and ensuring zero damages to the sensor;
b) ensures the interior base (23) stems (24) are kept extended, avoiding their movement towards the center. As a result, the anchorage system is remained still and the sensor structure is not at risk; and
c) the pressure dissipator serves as a filter and settling tank, thereby preventing intrusion of particles and residues into the protective metallic tube and their arrival at the sensor. The pressure dissipator plates (39) avoid the passing of particles bigger than the orifice diameter. For example, plates will avoid the passing of particles bigger than 4 mm, if the dissipator plate orifices are 4 mm in diameter.

The pressure dissipator (21) extends the sensor life and ensures the proper operation of the sensor after each tank filling. It also allows saving in system maintenance. The pressure dissipator (21) comprises plates (39) or covers at each side. These plates (39) are formed by a drilled frame, where orifice diameters vary from 1 to 10 mm; preferably, from 3 to 5 mm, and more preferably, 4 mm. The thickness of the plate (39) varies from 1 to 5 mm, where the preferably thickness is 2 mm. When fuel makes an impact on the first dissipator plate, the plate reduces the fuel pressure inside the dissipator, assuring that the fuel arrives passively at the sensor to avoid damage.

On the other hand, passing of fluid generates air inside the tank, the air travels to the top of the tank and is released freely through a breather located at the top of the fuel tank.

The lower or upper anchorage system can be installed in any type of fuel tank. For example, the anchorage system can be installed in a round, oval-shaped, square or rectangular tank, without the need for big perforations in the tank. In this way, the anchorage system installation does not put at risk the structural strength of the tank.

The pressure dissipator (21) is made up of a hollow cylindrical metallic piece similar to a tube, having a bevel at one end that allows attaching it to the lower anchorage system interior (16). This piece has plates (39) or covers at both ends with 4 mm perforations. These plates could be replaced by grills or plates or covers perforated with different diameters depending on the intended use of the system.

As explained herein, the pressure dissipator is a key component of the measuring device since it allows for the system operation and provides security and low maintenance, which extends the device and sensor life.

The remote monitoring system comprises a main battery (01) connected to a terminal (03) through a 30-pin connector (15) of the terminal (03) by using the positive continuous pin number 29 (it may range from 9 to 32 DVC) and the pin number 30 to negative or ground. The back-up battery (02) is powered by the external ports of the 5-12 connector (15) pins. The work embodiment is defined according to the planning file. Satellite GPS antenna (04) connects to terminal (03). Satellite GPS antenna (04) must be aligned and directed to communication satellites. GPRS (05) antenna connects to the terminal (03) using the terminal (03) RP SMA connector. The terminal (03) has a 30-pin green connector (15). The same pins powering the connectors (15) are used to power the sensor. Likewise, from the connector, data is sent to and received by the sensor (36) using data line connection means (09) with the connection pattern RS 485.

Data is sent to the sensor through pins TX, pin 2, EIA 485 line A, and data is received by pins RX, pin 3 EIA 485 line B. Information transmitted by the sensor (36) is sent by satellite with coordinates. Likewise, GPRS data is sent through the GPRS antenna (05) to the closest cellular antenna station (13), or they are sent by satellite, so sensor data is sent to Internet (06) and then travel looking for the destination IP address, which is that of the Web server (10). Information is stored and ordered according to the database(s) structure. This allows to access information from any remote means (14) with Internet access and Web browser.

The protection box (38) contains the satellite module and their corresponding antennas, a satellite GPS antenna (04) and GPRS antenna (05). The protection box (33) is placed outside the fuel tank on its top. This box contains the sensor (36) electronic connections. To install the protection box (33), the box base must be drilled to install fixing bolts that will support the box, and the metallic hose carrying the energy to the truck connection rack must be fixed with plastic cable ties. Eye terminals must be installed in each power line; then, check if the terminal receives energy through the power LED and verify the voltage received using a tester.

Assembly and Installation Procedure

Figure 8:
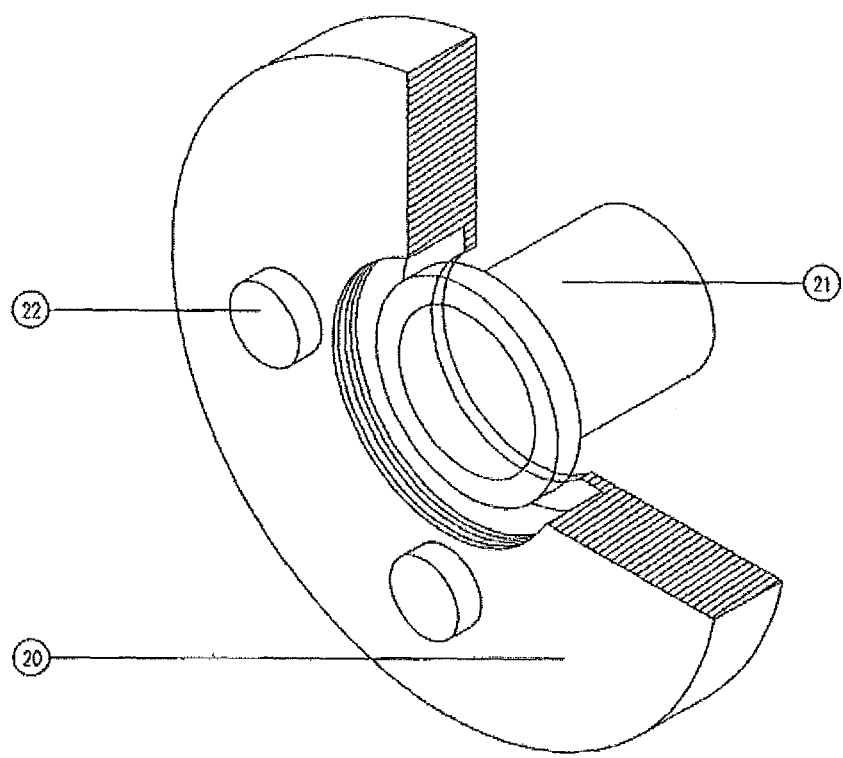
FIG. 8 illustrates a section of the pressure dissipator located in the exterior base showing more specifically the interior connection formed by the stems and the pressure dissipator located inside the anchorage system.

Assembly and installation procedure is divided into 3 stages:

1. Preliminary Procedures
   a. Empty the fuel tank and check if it is completely empty.
   b. Remove the tank breather plugs (07).
   c. Fill the tank (07) with water to the perforation level.
2. Lower anchorage system (16)
   a. Drill an orifice that is 1 mm bigger than the interior base (23) diameter. Then, drain the water from the tank (07) and wait until the tank is completely dry to proceed.
   b. After that, assemble the exterior base (20) with the packing (19) and interior base (23) using the Parker bolts (22) to join them (see FIGS. 4B, 4C).
      a. Previously assembled part is position in front of the tank perforation inserting the interior base (23) into the tank.
      b. Once the part is positioned inside the tank, stems (24) are extended outwards so they can make contact with the tank interior wall (see FIG. 8).
      c. With stems extended, the pressure dissipator (24) is inserted into the lower connection system (16), which, as explained in the description, attaches the stems (24) and lower connection system (16) to the tank.

d. Then, tighten the Parker bolts until the entire body—formed by parts 19, 20, 21, 22, 23, 24—is securely fitted to the tank (07).

e. Once this part is definitely fixed, connect elbow (18), which has a thread at one end, to the exterior base (20) at the end with the thread (see FIG. 7).

f. Upon installation of the lower anchorage system (16), you can connect the remaining part, including mainly the protective metallic tube (37), sensor (36) and upper anchorage system (27).

3. Assembly and Installation of Upper System a. Center elbow (18) and connect the protective metallic tube (37).

b. Fix and press the protective metallic tube (36).

c. Insert sensor (36) into the protective metallic tube, inserting the sealing rubber and fixing it with high-strength silicone.

d. Connect T-tube (34) and fix its lateral output next to the tank (07).

e. At the T-tube output (34), attach the American joint (35) and the fix the elbows (30, 31, 32) until they are connected to the tank breather (07).

f. Fix the protection box (33) on the top of the T-tube (34) wherein sensor (36) electronic connections are secured.

g. Install terminal (03), satellite GPS antenna (04) and GPRS antenna (05) inside the protection box (38) and make appropriate electronic connections.

h. Connect sensor (36) with terminal (03) using the data line connecting means (09).

i. Power sensor (36) and the devices installed in the protection box (38) using the electronic devices power line (08).

j. Check if the program receives the module signal by sending and receiving test messages.

k. Check if the program receives the module signal by sending and receiving test messages.

The invention claimed is:

1. A device that measures fluid level in fuel storage tanks of mining trucks resistant to rapid filling, is easily installed and effectively protects a sensor inside the device, comprising:
a protective metallic tube;
a level sensor arranged inside the protective metallic tube; and
an anchorage system connecting the protective metallic tube to the tank and allowing fluid communication between the tank and the protective metallic tube;
wherein the anchorage system comprises a packing, an exterior base mounted on the packing, a pressure dissipator located in the exterior base and attached to an interior base including stems that are expanded once the anchorage system is inserted into the tank, and the stems contact an interior surface of a tank wall;
the exterior base is attached to the interior base by bolts bolted from outside by holding the packing between the exterior base, the interior base and the tank wall;
the interior base is a cylindrical metallic piece whose diameter is smaller than a perforation diameter made in the tank, and has an inner orifice forming an inner diameter where the stems are radially perpendicularly distributed; and
the exterior base has a circular flat shape, with an outer diameter larger than the perforation diameter made in the tank and has a circular inner orifice whose diameter is larger than an outer diameter of the pressure dissipator, and the exterior base has an inner bevel to accommodate the pressure dissipator and hold it into place.

2. The device as recited in claim 1, wherein, the sensor is located outside the fuel tank and inside the protective metallic tube, and the protective metallic tube keeps a same fluid level as the tank.

3. The device as recited in claim 1, further comprising an upper anchorage system.

4. The device as recited in claim 1, wherein the interior base has a circular flat shape and thread perforations through which bolts are introduced and tightened to connect the exterior base and interior base together, and a circular inner orifice whose diameter is larger than the outer diameter of the pressure dissipator.

5. The device as recited in claim 1, wherein the exterior base has orifices through which bolts are inserted.

6. The device as recited in claim 4, wherein the stems are alternated with the thread perforations, and the pressure dissipator accommodated inside of the anchorage system keeps the stems expanded, avoiding their retraction and loosening of the anchorage system.

7. The device as recited in claim 1, wherein the pressure dissipator comprises plates or covers that prevent a fuel level from turbulently raising to a sensor interior to thereby avoid potential damage to the sensor, and the plates or covers inside the pressure dissipator have a screen with orifices or grillwork that allows reducing a speed at which fuel enters the protective metallic tube where the sensor is located.

* * * * *